(12) United States Patent
Kato

(10) Patent No.: US 10,076,843 B2
(45) Date of Patent: Sep. 18, 2018

(54) TEACHING APPARATUS FOR ROBOT PROVIDED WITH GUIDE PART FOR DETERMINING POSITION AND POSTURE OF END EFFECTOR

(71) Applicant: FANUC CORPORATION, Yamanashi (JP)

(72) Inventor: Yoshiaki Kato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 62 days.

(21) Appl. No.: 15/210,887

(22) Filed: Jul. 15, 2016

(65) Prior Publication Data

US 2017/0014995 A1    Jan. 19, 2017

(30) Foreign Application Priority Data

Jul. 16, 2015  (JP) .................................. 2015-142369

(51) Int. Cl.
| | | |
|---|---|---|
| *G05B 15/00* | (2006.01) | |
| *G05B 19/00* | (2006.01) | |
| *B25J 13/08* | (2006.01) | |
| *B25J 9/16* | (2006.01) | |
| *B25J 15/00* | (2006.01) | |
| *G05B 19/425* | (2006.01) | |

(52) U.S. Cl.
CPC .......... *B25J 13/085* (2013.01); *B25J 9/1633* (2013.01); *B25J 15/0095* (2013.01); *G05B 19/425* (2013.01); *G05B 2219/39021* (2013.01); *Y02P 90/265* (2015.11)

(58) Field of Classification Search
CPC .... B25J 13/085; B25J 15/0095; B25J 9/1633; G05B 19/425; G05B 2219/39021; Y02P 90/265

USPC .......................................................... 700/264
See application file for complete search history.

(56) References Cited

U.S. PATENT DOCUMENTS

| | | | | |
|---|---|---|---|---|
| 2009/0047376 A1* | 2/2009 | Galt | .................... | B29C 33/0066 425/588 |
| 2013/0054025 A1* | 2/2013 | Ito | ......................... | B25J 9/1697 700/246 |
| 2015/0290809 A1* | 10/2015 | Nakagawa | ............. | B25J 9/1676 700/258 |

FOREIGN PATENT DOCUMENTS

| | | | |
|---|---|---|---|
| JP | 1-121904 A | 5/1989 | |
| JP | 4-211807 A | 8/1992 | |
| JP | 4-256526 A | 9/1992 | |
| JP | 2002-160183 A | 6/2002 | |
| JP | 2011-230234 A | 11/2011 | |
| JP | 2011-230257 A | 11/2011 | |
| JP | 2012-232396 A | 11/2012 | |
| JP | 2014-176940 A | 9/2014 | |

(Continued)

*Primary Examiner* — Harry Y Oh
(74) *Attorney, Agent, or Firm* — Hauptman Ham, LLP

(57) ABSTRACT

A teaching apparatus for robot includes a force sensor disposed between an arm of a robot and an end effector, and a guide part attached to the end effector. An object includes a recessed part. The recessed part has a reference surface, with which target surface of the end part of the guide part are brought into surface-contact so as to determine a position and a posture of the robot. A robot control device performs a control for bringing the target surface of the guide part into surface-contact with the reference surface of the recessed part so as to determine a teaching position of the robot, based on the direction of a force applied to the end effector.

2 Claims, 9 Drawing Sheets

(56) References Cited

FOREIGN PATENT DOCUMENTS

JP    2015-33747 A    2/2015

\* cited by examiner

TEACHING APPARATUS FOR ROBOT PROVIDED WITH GUIDE PART FOR DETERMINING POSITION AND POSTURE OF END EFFECTOR

RELATED APPLICATIONS

The present application claims priority to Japanese Patent Application Number 2015-142369 filed Jul. 16, 2015, the disclosure of which is hereby incorporated by reference herein in its entirety.

BACKGROUND OF THE INVENTION

1. Field of the Invention

The present invention relates to a teaching apparatus for robot.

2. Description of the Related Art

A robot is controlled to move along a preliminarily prepared track. The track of the robot can be prepared based on a teaching position and a speed, which are designated by an operator. The teaching position can be set by an operator's operation via an operation panel. The operator operates the teaching operation panel to, for example, set the robot at a desired position and posture. The operator can store, as a teaching point, the position, at that time, of the tip point of a tool in the robot, in a control device. The operator can also store the posture of the robot in the control device. Further, the control device can drive the robot so that the robot passes through the teaching point or passes the vicinity of the teaching point. The position and the posture of the robot are determined based on the teaching position, and accordingly, it is preferable to accurately teach the teaching position to the robot.

Japanese Unexamined Patent Publication No. 2002-160183A discloses a robot used in a substrate processing system. This publication discloses a teaching operation for indirectly identifying the position of a robot by positioning a position adjusting pin at a predetermined hole.

When teaching a teaching position to a robot, it is difficult to manually move the robot to a desired teaching position in some cases. There is, for example, an operation for teaching a teaching position in an operation for attaching a workpiece to a predetermined member. In this operation, when an operator can verify the portion to which the workpiece is attached, it is easy to teach the teaching position for the robot. However, in some cases, the portion to which the workpiece is attached is located at a retracted portion of a recessed part, or is located on the inside of a hole. In such a case, when the workpiece is introduced into the recessed part or the hole, both the workpiece and the attachment position cannot be seen, and it is difficult to manually move the robot to a desired teaching position.

In the above teaching method in Japanese Unexamined Patent Publication No. 2002-160183A, a position adjusting pin is inserted into a predetermined reference hole, to determine the position of a robot. Thus, the accuracy of the teaching position depends on the accuracy of the relative position of the position adjusting pin to the reference hole. Tightly fitting of the position adjusting pin to the reference hole improves the accuracy of the teaching position, but increases the difficulty of fitting the position adjusting pin to the reference hole. Consequently, a teaching operation requires a long period of time. In contrast, loose fitting of the position adjusting pin to the reference hole reduces the accuracy of the teaching position.

SUMMARY OF THE INVENTION

A teaching apparatus for robot according to the present invention determines a position and a posture of an end effector attached to a robot with respect to a predetermined object, and stores, as a teaching position, a position and a posture of the robot corresponding to the position and the posture of the end effector. The teaching apparatus for robot includes a robot control device for controlling the robot, and a force sensor which is disposed between an arm of the robot and the end effector and which detects a force applied to the end effector and the direction of the force. The teaching apparatus for robot includes a guide part attached to one member among the end effector and the object. The other member among the end effector and the object includes a recessed part having a sectional shape which corresponds to a shape of an end part of the guide part and which is larger than a sectional shape of the end part of the guide part. The guide part has a target surface formed in the end part. The recessed part has a reference surface, with which the target surface of the guide part is brought into surface-contact so as to determine the position and the posture of the robot. The force sensor detects a direction of a force applied to the end effector when the target surface of the guide part is brought into surface-contact with the reference surface of the recessed part. The robot control device performs a control for bringing the target surface of the guide part into surface-contact with the reference surface of the recessed part based on the direction of the force applied to the end effector, to adjust the position and the posture of the robot and to determine the teaching position of the robot with respect to the object.

In the above invention, it is preferable that the guide part is formed so as to be detachable from the one member.

In the above invention, it is preferable that a teaching operation panel which is connected to the robot control device and via which the robot is manually operated is provided. It is preferable that the robot control device performs a control for stopping the robot, when a force applied to the end effector exceeds a predetermined judgement value, while an operator performs a manual operation for inserting the end part of the guide member into the recessed part.

DETAILED DESCRIPTION

A teaching apparatus for robot in an embodiment will be described with reference to FIGS. 1 to 14. The teaching apparatus for robot according to the present embodiment determines the position and the posture of an end effector attached to a robot with respect to a predetermined object. Further, the teaching apparatus for robot stores the position and the posture of the robot as a teaching position, which correspond to the position and the posture of the positioned end effector.

Figure 1:
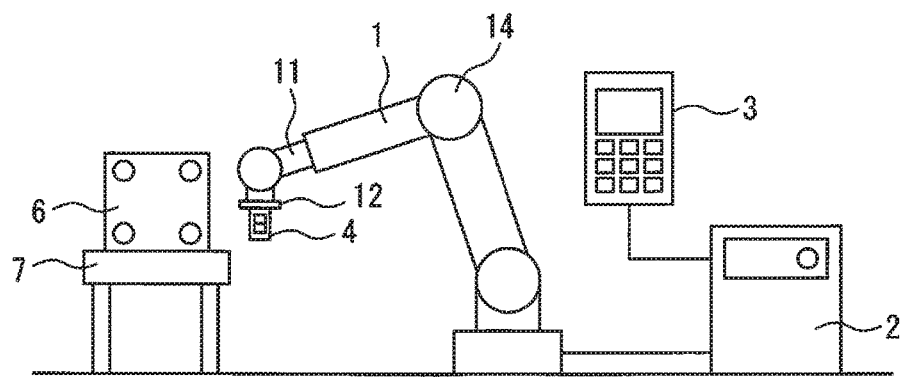
FIG. 1 is a schematic view of a robot system in an embodiment.

FIG. 1 is a schematic view of a robot system according to the present embodiment. The robot system is provided with a robot 1 for disposing an end effector 4 at a predetermined position and posture, and a control device 2 as a robot control device for controlling the robot 1. The robot 1 according to the present embodiment is an articulated robot including an arm 11 and a plurality of joint parts 14. The articulated robot can freely change the position and the posture of a wrist part of the arm 11. The robot 1 can dispose a workpiece grasped by the end effector 4 at a desired position and posture.

The robot 1 is provided with a force sensor 12. The force sensor 12 is provided between the arm 11 and the end effector 4. The force sensor 12 detects a force applied to the end effector 4. In the present embodiment, a 6-axis force sensor 12 which can detect forces in directions of 3 orthogonal axes and forces (moments) around the 3 orthogonal axes, is adopted. The 6-axis force sensor 12 can detect, for example, forces in directions of 3 orthogonal axes (X, Y, Z) in the wrist part provided at the tip of the arm 11 and moments (Mx, My, Mz) around the axes. Examples of the force sensor 12 include any force sensors, such as sensors including a strain sensor, or a capacitance sensor.

The robot system according to the present embodiment is provided with a teaching operation panel 3 for manually operating the robot 1. The teaching operation panel 3 is connected to the control device 2. An operator can manually drive the robot 1 by operating the teaching operation panel 3.

Figure 2:
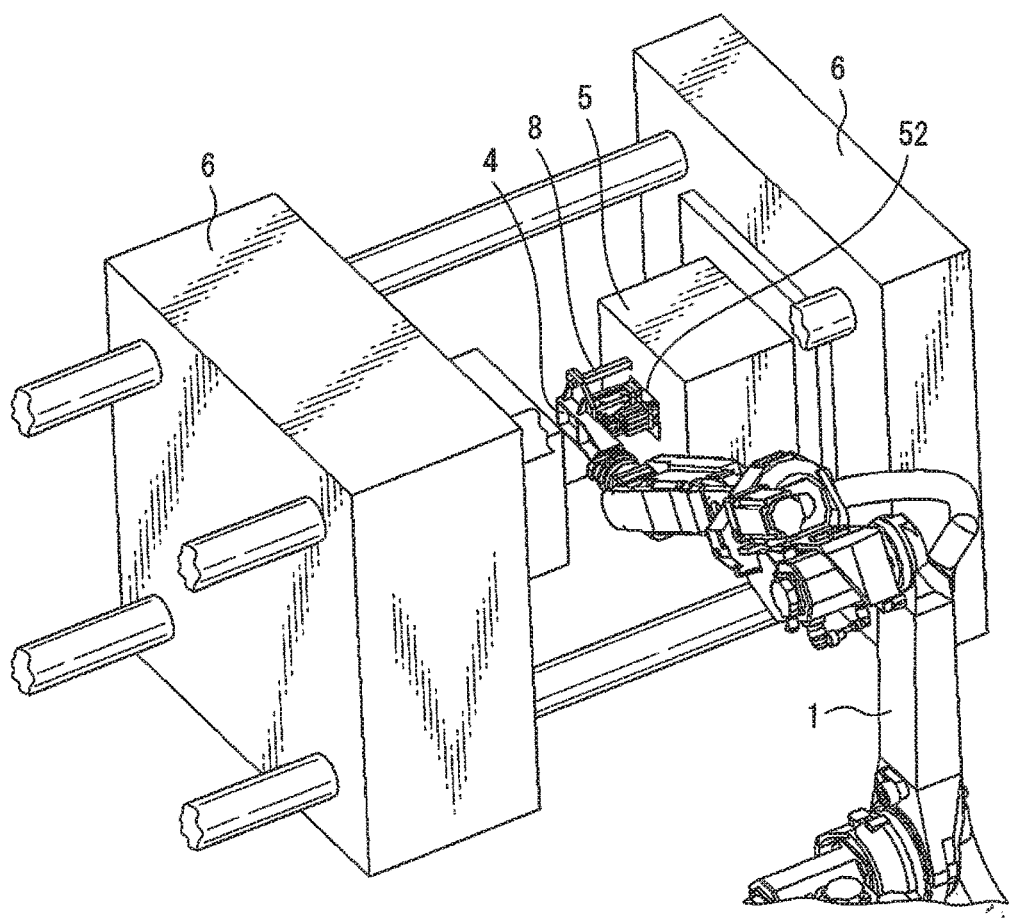
FIG. 2 is a perspective view of an end effector, a robot, and a molding die in an embodiment.

FIG. 2 is a perspective view of a robot, an end effector, and a molding die. In the present embodiment, the robot 1 disposes a workpiece at a predetermined position of a predetermined object. The object in the present embodiment is a molding die 5 for performing insert molding. In the insert molding, a predetermined component is disposed in the inside of the molding die 5. Subsequently, a resin is supplied to the inside of the molding die 5 so as to form a resin portion secured to the predetermined component. The resin portion has a shape corresponding to the shape of a space defined in the inside of the molding die 5. The workpiece in the present embodiment is made of metal. A cavity is formed in the inside of the molding die 5. Further, a mount part, to which a workpiece 9 is disposed, is formed in the inside of the molding die 5.

With reference to FIGS. 1 and 2, the molding die 5 is supported by a molding die supporting member 6. The molding die supporting member 6 is supported by a work table 7. Examples of the work table 7 include any table to which the molding die supporting member 6 is secured. Alternatively, the work table 7 may be, for example, a conveyor which can convey the molding die supporting member 6. In a preliminary work, the molding die supporting member 6 to which the molding die 5 is secured is disposed at a predetermined position of the work table 7. Namely, an object is disposed at a predetermined position. In this state, the operation in which a teaching position is taught to the robot 1 is performed.

Figure 3:
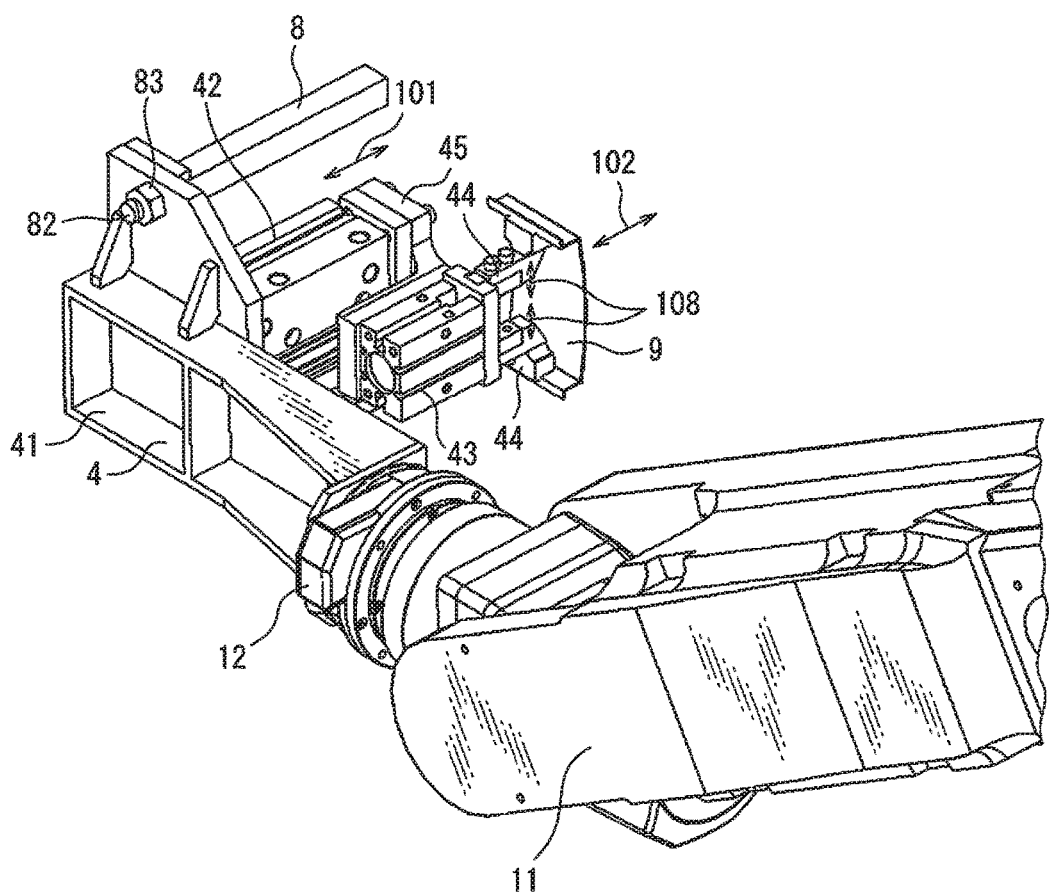
FIG. 3 is an enlarged perspective view of an end effector and a guide member in an embodiment.

FIG. 3 is an enlarged perspective view of an end effector in the present embodiment. The end effector 4 in the present embodiment is provided with a base element 41 secured to the force sensor 12. A guide cylinder 42 for moving the workpiece 9 with respect to the base element 41 is secured to the base element 41. A coupling member 45 is secured to a cylinder shaft of the guide cylinder 42. The end effector 4 includes chucks 44 for grasping or releasing the workpiece 9. The workpiece 9 is grasped by a pair of chucks 44. The end effector 4 includes a chuck driving cylinder 43 for driving the chucks 44. The chuck driving cylinder 43 is secured to the coupling member 45.

The guide cylinder 42 is driven so as to integrally move the coupling member 45 and the chuck driving cylinder 43 in the direction designated by an arrow 101. In the present embodiment, as designated by an arrow 102, the workpiece 9 is moved in the direction perpendicular to a largest area surface which has the largest area in the base element 41. The chuck driving cylinder 43 is driven so as to open or close the pair of chucks 44 as designated by an arrow 108.

The teaching apparatus for robot in the present embodiment is provided with a guide member 8 serving as a guide part attached to the end effector 4. The guide member 8 has a function for setting the position and the posture of the end effector 4. The guide member 8 of the present embodiment is shaped like a bar. The guide member 8 is formed so as to have a quadrangular section. The guide member 8 has a threaded part 82. The threaded part 82 penetrates through the base element 41. A nut 83 is fastened to the threaded part 82 so as to secure the guide member 8 to the base element 41.

The guide member 8 in the present embodiment is formed to be detachable. Removal of the nut 83 enables the guide member 8 to be removed from the base element 41. As a structure for attaching the guide member 8 to the end effector 4, any fixation structure can be adopted. For example, the guide member 8 may be secured to the base element 41 by a bolt.

Figure 4:
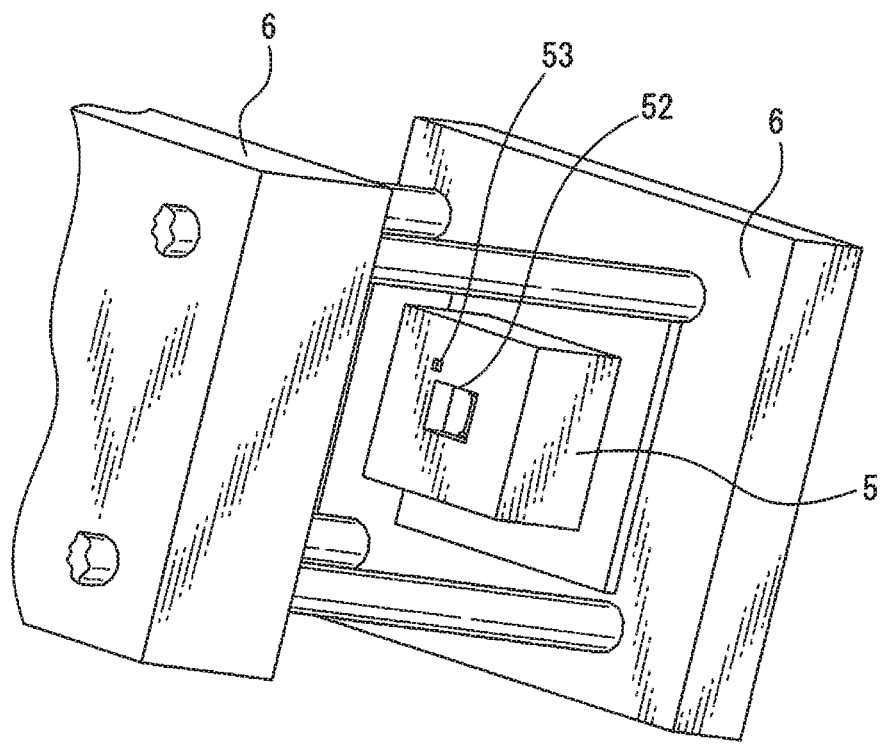
FIG. 4 is a perspective view of a molding die supporting member and a molding die in an embodiment.

FIG. 4 is a perspective view of a molding die and a molding die supporting member in the present embodiment. The molding die 5 in the present embodiment has an opening 52 communicating with the inner cavity. The workpiece 9 is inserted into the molding die 5 through the opening 52. Further, the molding die 5 has a recessed part 53 to which an end part of the guide member 8 is inserted.

Figure 5:
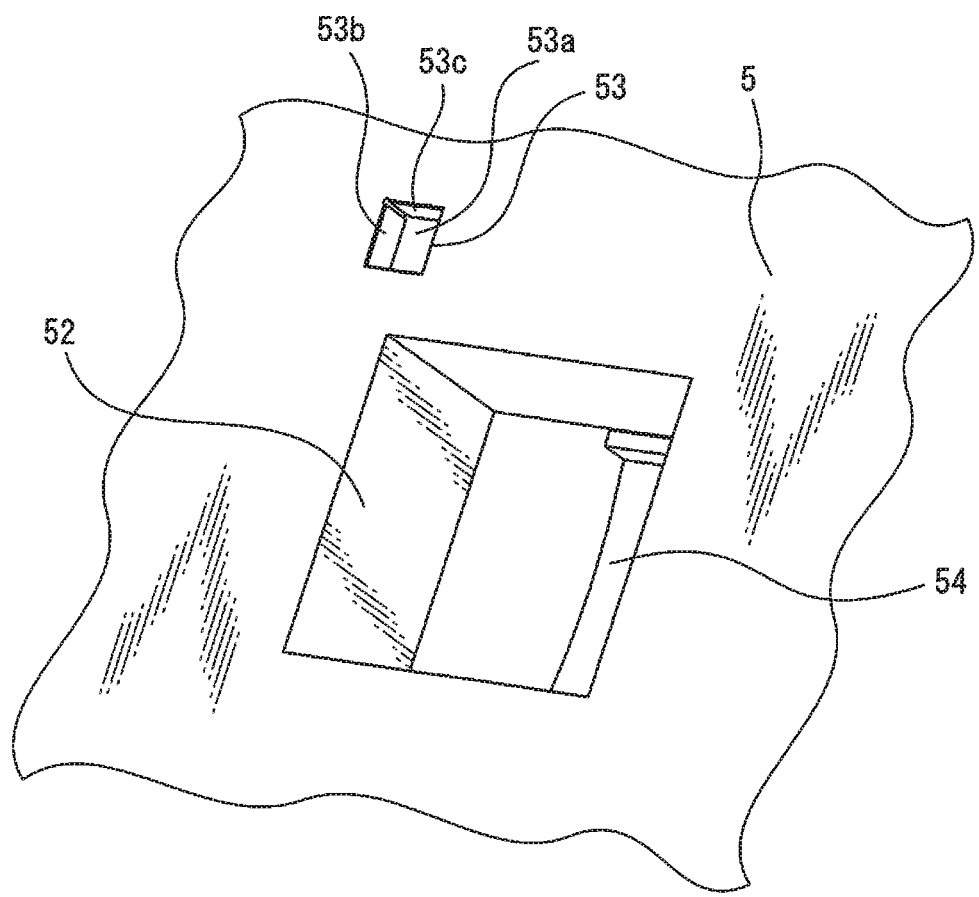
FIG. 5 is an enlarged perspective view of an opening and a recessed part, which are formed in a molding die.

FIG. 5 is an enlarged perspective view of an opening and a recessed part of a molding die. A mount part 54 on which the workpiece 9 is mounted is formed in the inner space of the molding die 5. In the present embodiment, the robot 1 performs an operation for disposing the workpiece 9 on the mount part 54. The recessed part 53 is formed in the surface of the molding die 5, which is opposed to the guide member 8. The recessed part 53 in the present embodiment is formed so as to have a quadrangular section. The recessed part 53 has a plurality of reference surfaces. Each reference surface of the present embodiment is shaped like a plain surface. The recessed part 53 has a first reference surface 53a, a second reference surface 53b, and a third reference surface 53c. The first reference surface 53a is the bottom face of the recessed part 53. The second reference surface 53b and the third reference surface 53c are side faces of the recessed part 53.

Figure 6:
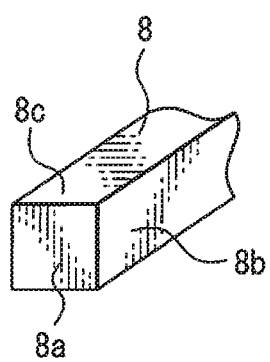
FIG. 6 is a perspective view of an end part of a guide member in an embodiment.

FIG. 6 is an enlarged perspective view of an end part of a guide member in the present embodiment. The guide member 8 is shaped like a quadrangular prism. The guide member 8 has a plurality of target surfaces. An end face of the guide member 8 corresponds to a first target surface 8a. Two side faces of the guide member 8 correspond to a second target surface 8b and a third target surface 8c. Each target surface of the present embodiment is shaped like a plain surface.

The recessed part 53 has a section larger than that of an end part of the guide member 8. Namely, when an end part of the guide member 8 is inserted into the recessed part 53, a clearance is defined between a side face of the recessed part 53 and a side face of an end part of the guide member 8. The recessed part 53 is formed so that, when an end part of the guide member 8 is inserted into the recessed part 53, the guide member 8 can move in the inside of the recessed part 53.

Figure 7:
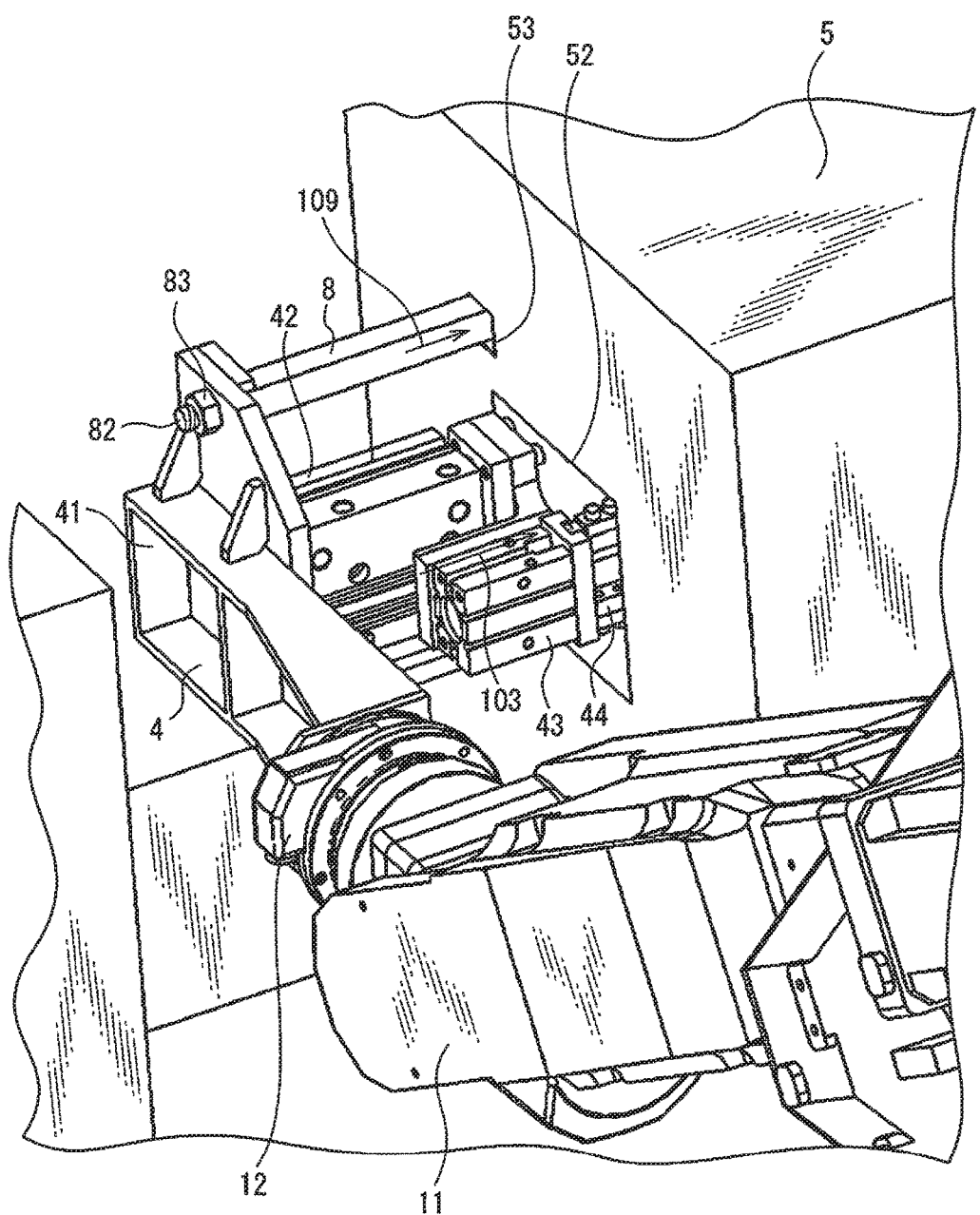
FIG. 7 is a perspective view of an end effector and a molding die when a guide member is inserted to a recessed part of the molding die.

FIG. 7 is an enlarged perspective view of an end effector and a molding die when a guide member is inserted to a recessed part. The guide member 8 and the recessed part 53 are formed so that, when the plurality of target surfaces of the guide member 8 are brought into surface-contact with the plurality of reference surfaces of the recessed part 53, the end effector 4 has a desired position and posture with respect to the molding die 5. Thus, the end effector 4 is positioned so that the target surfaces of the guide member 8 are brought into surface-contact with the corresponding reference surfaces of the recessed part 53. In this position and posture of the end effector 4, the workpiece 9 can be disposed at a desired position of the mount part 54 by inserting the workpiece 9 into the molding die 5 using the guide cylinder 42.

In the present embodiment, the first target surface 8a of the guide member 8 is brought into surface-contact with the first reference surface 53a of the recessed part 53. The second target surface 8b of the guide member 8 is brought into surface-contact with the second reference surface 53b of the recessed part 53. Further, the third target surface 8c of the guide member 8 is brought into surface-contact with the third reference surface 53c of the recessed part 53. The control device 2 stores, as a teaching position, the position and the posture of the robot 1 when each target surface is brought into contact with the corresponding reference surface.

Figure 8:
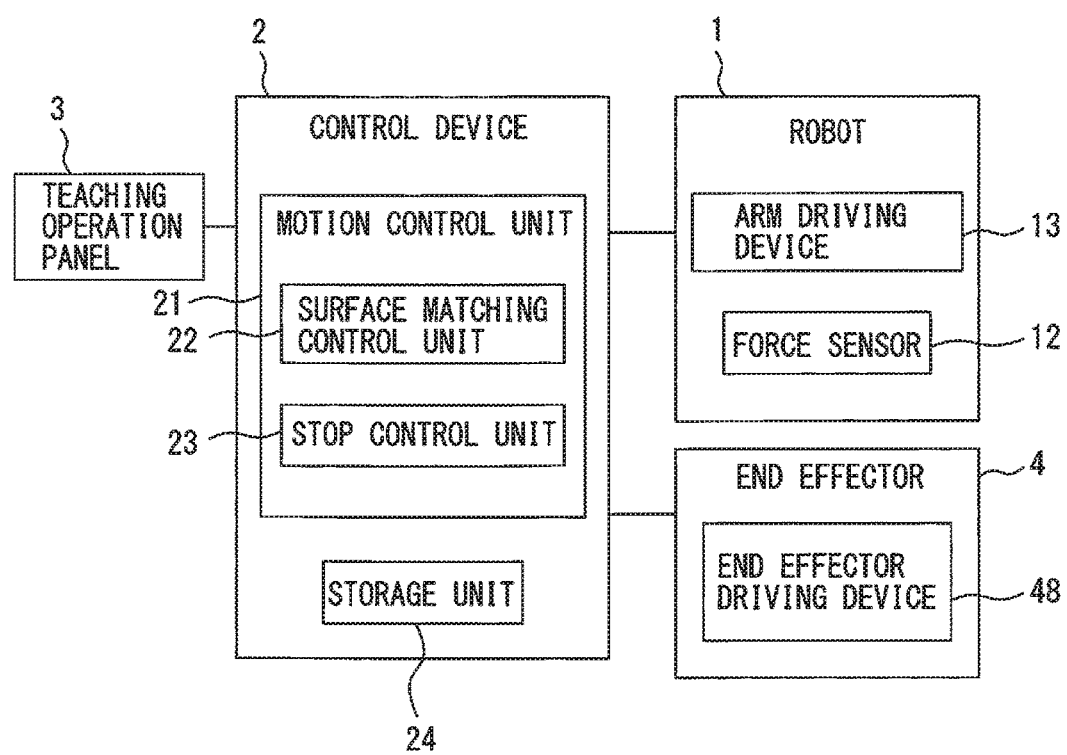
FIG. 8 is a block diagram of a robot system in an embodiment.

FIG. 8 is a block diagram of a robot system in the present embodiment. The control device 2 includes an arithmetic processing unit having, for example, a central processing unit (CPU), a random access memory (RAM), and a read only memory (ROM), which are connected to one another via a bus line. The control device 2 has a storage unit 24 for storing, for example, a teaching position or an operation program. The signals of forces and their directions, which are detected by the force sensor 12, are transmitted to the control device 2.

The robot 1 includes an arm driving device 13 having arm driving motors disposed in the joint parts 14. The arm driving device 13 is driven to bend the arm 11 via the joint parts 14 at a desired angle. The end effector 4 includes an end effector driving device 48 having the guide cylinder 42 and the chuck driving cylinder 43.

The arm driving device 13 and the end effector driving device 48 are controlled by the control device 2. The control device 2 includes a motion control unit 21 for controlling the motion of the robot 1. When manually operating the robot 1, an operator operates the teaching operation panel 3. The motion control unit 21 transmits a motion command for driving the robot 1 to the arm driving device 13. The arm driving device 13 drives the arm driving motors etc. based on the motion command. The arm driving motors are driven to adjust the angle of fold at the joint parts 14 of the arm 11 or the direction of the arm 11. Namely, the position and the posture of the robot 1 are adjusted.

Further, the motion control unit 21 transmits a motion command to the end effector driving device 48. The end effector driving device 48 moves the guide cylinder 42 and the chuck driving cylinder 43 based on the motion command. Consequently, a cylinder rod of the guide cylinder 42 is moved, or the chucks 44 are open or closed.

With reference to FIGS. 7 and 8, the operator operates, at the beginning, the teaching operation panel 3 so as to manually drive the robot 1. Further, as designated by an arrow 109, an end part of the guide member 8 is inserted into the recessed part 53 of the molding die 5. In this respect, the sectional shape of the recessed part 53 is larger than the sectional shape of the end part of the guide member 8, and thus, the operator can easily dispose the end part of the guide member 8 within the recessed part 53 of the molding die 5.

Figure 9:
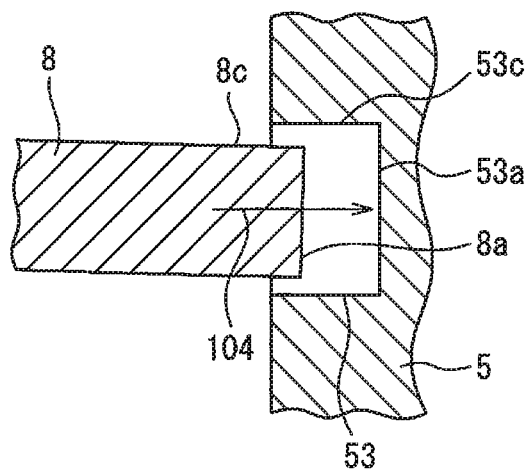
FIG. 9 is a first enlarged sectional view illustrating the state of an end face of a guide member being brought into surface-contact with the bottom face of a recessed part in a surface matching control.

FIG. 9 is a schematic sectional view illustrating the state of an end part of a guide member being inserted to a recessed part. The guide member 8 is manually operated by an operator, and accordingly, its extending direction is not always perpendicular to the first reference surface 53a of the recessed part 53. Namely, the first target surface 8a is not always parallel to the first reference surface 53a.

With reference to FIG. 8, the motion control unit 21 in the present embodiment has a surface matching control unit 22. The surface matching control unit 22 has a function for automatically adjusting the position and the posture of the robot 1 so that target surfaces and reference surfaces are in surface-contact with each other. The surface matching control is performed by the operation program preliminarily stored in the storage unit 24.

The surface matching control unit 22 brings the target surfaces of the guide member 8 into contact with the reference surfaces of the recessed part 53. In this respect, the guide member 8 is in line-contact or point-contact with the recessed part 53 in some cases. The surface matching control unit 22 detects a magnitude of the force and a direction of the force when the guide member 8 is brought into contact with the recessed part 53. In the present embodiment, the surface matching control unit 22 detects torque serving as a force in straight directions or a force in the direction of rotation. Further, the surface matching control unit 22 adjusts the position and the posture of the robot 1 based on the forces applied to the end effector 4 and their directions so that the target surfaces are brought into surface-contact with the reference surfaces. Here, the surface contact means that predetermined two surfaces contact with each other so that contact part is configured by a surface.

In an example shown in FIG. 9, the surface matching control unit 22 moves the guide member 8 as designated by an arrow 104. The first target surface 8*a* is brought into contact with the first reference surface 53*a*. At this time, the surface matching control unit 22 adjusts the position and the posture of the robot 1 based on output signals from the force sensor 12, so that the first target surface 8*a* is brought into surface-contact with the first reference surface 53*a*.

Figure 10:
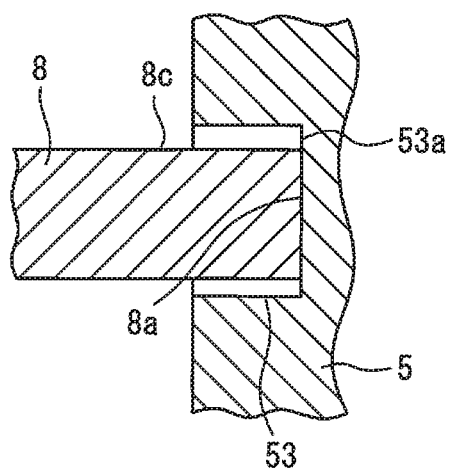
FIG. 10 is a second enlarged sectional view illustrating the state of an end face of a guide member being brought into surface-contact with the bottom face of a recessed part in the surface matching control.

FIG. 10 is a schematic sectional view illustrating the state after a first target surface and a first reference surface are matched by a surface matching control. The first target surface 8*a* of the guide member 8 is in surface-contact with the first reference surface 53*a* of the recessed part 53. The entirety of the first target surface 8*a* is in close contact with the first reference surface 53*a*.

Figure 11:
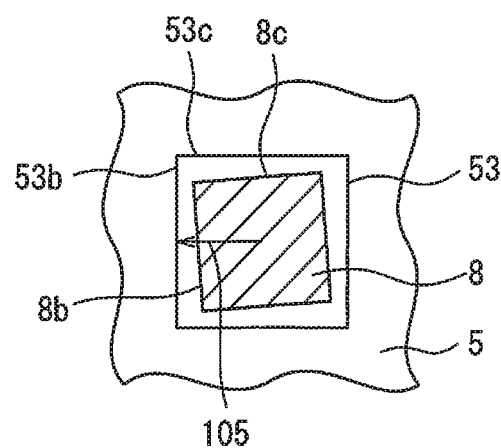
FIG. 11 is a first enlarged partial sectional view illustrating the state of a side face of a guide member being brought into surface-contact with a side face of a recessed part in the surface matching control.

FIG. 11 is a partial sectional view illustrating the state of a first target surface of a guide member being in surface-contact with a first reference surface of a recessed part. FIG. 11 is a diagram of the recessed part 53 in planar view. Even when the first target surface 8*a* is in surface-contact with the first reference surface 53*a*, the sectional shape of the guide member 8 is seen to be inclined with respect to the shape of the recessed part 53 in planar view in some cases. In an example shown in FIG. 11, the second target surface 8*b* of the guide member 8 is not parallel to and is inclined with respect to the second reference surface 53*b* of the recessed part 53.

Subsequently, the surface matching control unit 22 of the motion control unit 21 controls the surface alignment between the second target surface 8*b* and the second reference surface 53*b*. The surface matching control unit 22 controls the robot 1 so that the guide member 8 moves as designated by an arrow 105. Further, the surface matching control unit 22 performs a surface matching control so that the second target surface 8*b* is brought into surface-contact with the second reference surface 53*b*. In this respect, the surface matching control unit 22 controls the robot 1 so that the surface contact between the first target surface 8*a* and the first reference surface 53*a* is maintained.

Figure 12:
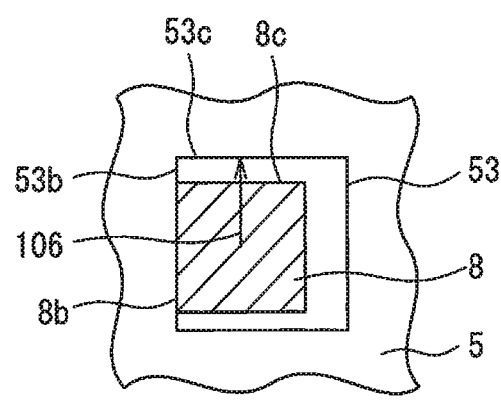
FIG. 12 is a second enlarged partial sectional view illustrating the state of a side face of a guide member being brought into surface-contact with a side face of a recessed part in the surface matching control.

FIG. 12 is a partial sectional view illustrating the state of a second target surface being in surface-contact with a second reference surface by a surface matching control. The second target surface 8*b* is in close contact with the second reference surface 53*b*. Subsequently, the surface matching control unit 22 controls the surface alignment between the third target surface 8*c* and the third reference surface 53*c*. The surface matching control unit 22 controls the robot 1 so that the guide member 8 moves toward the third reference surface 53*c* as designated by an arrow 106. Further, a surface matching control is performed so that the third target surface 8*c* is brought into surface-contact with the third reference surface 53*c*. In this respect, the surface matching control unit 22 controls the robot 1 so that the surface contact between the first target surface 8*a* and the first reference surface 53*a* is maintained. Further, the surface matching control unit 22 controls the robot 1 so that the surface contact between the second target surface 8*b* and the second reference surface 53*b* is maintained.

Figure 13:
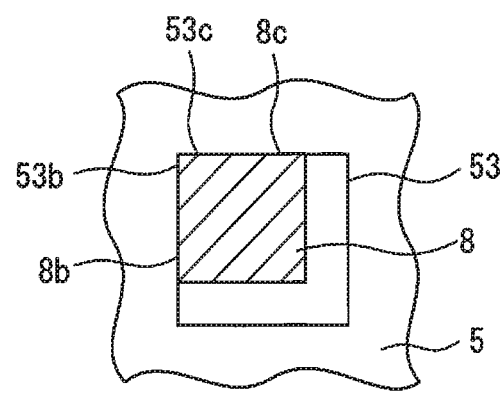
FIG. 13 is a third enlarged partial sectional view illustrating the state of a side face of a guide member being brought into surface-contact with a side face of a recessed part in the surface matching control.

FIG. 13 is a partial sectional view illustrating the state in which all surface matching controls are complete. All the target surfaces are in surface-contact with the corresponding reference surfaces. Thus, the end effector 4 can be positioned with respect to the molding die 5. Further, the control device 2 causes the storage unit 24 to store the position and the posture of the robot 1 as a teaching position in the state in which the position of the end effector 4 is determined. With reference to FIGS. 5 and 7, when the positioning operation is complete, the guide cylinder 42 is driven to move the workpiece 9 into the molding die 5 as designated by the arrow 103, so that the workpiece 9 can be disposed at a desired position of the mount part 54 of the molding die 5.

As described above, the teaching apparatus for robot in the present embodiment performs the control to bring the target surface of the guide member into surface-contact with the reference surface of the recessed part based on the direction of a force applied to an end effector. In order to perform a surface matching control, a motion program for surface matching can be preliminarily made and stored in a storage unit. The surface matching control is automatically performed based on the motion program stored in the storage unit. Further, the adjusted position and posture of a robot can be stored as a teaching position.

In the teaching apparatus for robot according to the present embodiment, an operator first manually disposes an end part of the guide member 8 in the inside of the recessed part 53 of the molding die 5. The recessed part 53 of the molding die 5 has a sectional shape larger than that of an end of the guide member 8. Thus, an operator can easily insert an end part of the guide member 8 into the recessed part 53. Subsequently, the surface matching control unit 22 of the control device 2 automatically controls the position and the posture of the robot 1. Thus, the operator can easily and accurately teach a teaching position. Further, an operator can easily set a teaching position even when it is difficult to see a workpiece because an attachment part for the workpiece is disposed in the inside of a recessed part or an opening.

In an actual operation for disposing a workpiece, the control device 2 determines the position and the posture of the robot 1 based on a predetermined teaching position. Further, the guide cylinder 42 is driven to attach the workpiece 9 to the mount part 54 in the inside of the molding die 5. The guide member 8 in the present embodiment is formed so as to be detachable. This structure enables the guide member 8 to be detached when the robot is driven based on the teaching position to dispose the workpiece 9 at a desired position. The guide member 8 can be prevented from interfering with other objects.

In an actual operation, after the workpiece 9 is attached to the mount part 54, the chuck driving cylinder 43 is driven to release the workpiece 9. After that, the guide cylinder 42 causes the chuck driving cylinder 43 and the chucks 44 to return to a retracted position. Further, the end effector 4 can be moved away from the molding die 5.

With reference to FIG. 8, once receiving a teaching position, the control device 2 causes the storage unit 24 to store the teaching position. Then, the position and the posture of the robot 1 are controlled based on the teaching position stored in the storage unit 24. Thus, in a usual operation, a guide part is not necessary. However, when the robot 1 is driven, an accidental error may occur in a position, at which the workpiece 9 is disposed, depending on the repetitive accuracy of the robot 1. Thus, when the workpiece 9 is accurately positioned with respect to the mount part 54 of the molding die 5, the above surface matching control may be performed every time the workpiece 9 is disposed.

In such a case, the control device 2 causes an end part of the guide member 8 to be inserted into the recessed part 53, and performs a surface matching control after the insertion, based on a predetermined motion program. The surface matching control unit 22 controls the position and the posture of the robot 1 so that a plurality of target surfaces are brought into surface-contact with a plurality of reference surfaces. After that, the motion control unit 21 drives the end effector driving device 48 so as to move the workpiece 9 to the mount part 54.

Meanwhile, in the present embodiment, the operator manually drives the robot 1, to perform an operation for inserting an end part of the guide member 8 into the recessed part 53. During this operation, the guide member 8 or the end effector 4 interferes with other objects in some cases.

The motion control unit 21 in the present embodiment includes a stop control unit 23. The stop control unit 23 detects a force applied to the end effector 4 at the force sensor 12, during an operation in which an operator manually inserts an end part of the guide member 8 into the recessed part 53. Further, when the force applied to the end effector 4 exceeds a predetermined judgement value, a control for stopping the robot 1 is performed. This control prevents a workpiece from being damaged or prevents an end effector from being broken, during the manual operation. When stopping the robot, the stop control unit 23 can perform, for example, a control for displaying an alarm on a display part of the control device 2.

Figure 14:
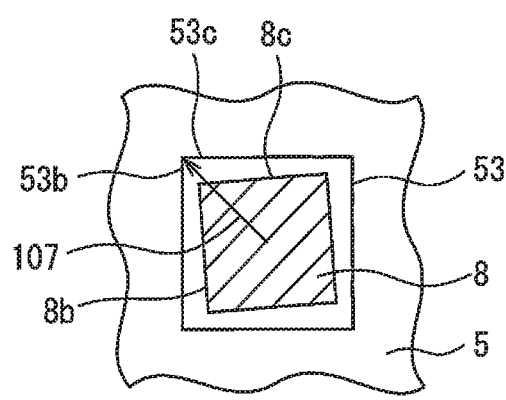
FIG. 14 is an enlarged partial sectional view illustrating the state of a side face of a guide member being brought into surface-contact with a side face of a recessed part in an another surface matching control.

FIG. 14 is a partial sectional view of a recessed part and a guide member, which explains another surface matching control in the present embodiment. In the above embodiment, the surface matching control unit 22 separately performs the respective controls for bringing each target surface into surface-contact with the corresponding one of reference surfaces. However, the mode of operation is not limited to this mode. The surface matching control unit 22 may perform a control for simultaneously bringing a plurality of target surfaces into surface-contact with a plurality of reference surfaces.

In an example of the surface matching control shown in FIG. 14, the surface matching control unit 22 moves the guide member 8 as designated by an arrow 107 after performing a surface matching operation of the first target surface 8a. Further, the surface matching control unit 22 simultaneously performs a surface matching control of the second target surface 8b and a surface matching control of the third target surface 8c. Alternatively, the surface matching control unit 22 may simultaneously perform the surface matching operations of the first target surface 8a, the second target surface 8b, and the third target surface 8c. Thus, when a plurality of target surfaces are brought into surface-contact with a plurality of reference surfaces, any surface matching operations can be performed at any order of operations.

Further, in the present embodiment, the guide part is attached to the end effector, and the recessed part is formed in the molding die as the object. However, the mode is not limited to this mode. A guide part may be attached to the object and a recessed part may be formed in an end effector. Namely, it is only required that the guide part is attached to one member among the end effector and the object, and the recessed part is formed in the other member among the end effector and the object.

Further, the sectional shape of the recessed part and the guide part is not limited to a quadrangular shape, and may be any shape in which the position and the posture can be determined by a surface matching control. Examples of the sectional shape of the recessed part and the guide part include any polygonal shape or any shape obtained by cutting out a part of a circle. The sectional shape of the recessed part and the guide part may include a curved line. Further, the guide part in the present embodiment is shaped like a bar. However, the guide part is not limited to this mode. Any shape in which face matching can be performed with respect to the recessed part can be adopted.

The end effector in the present embodiment is provided with a guide cylinder for moving a workpiece. This structure can prevent a workpiece from being in contact with a molding die while a robot is driven to bring an target surface of a guide member into surface-contact with a reference surface of a recessed part. The end effector is not limited to this mode, and may be provided without a mechanism for moving a workpiece.

In the present embodiment, an articulated robot has been described as an example. However, the robot is not limited to this mode. The present invention can be applied to a robot control apparatus for teaching a teaching position to any robot.

The present invention can provide a teaching apparatus for robot, which easily and accurately teaches a teaching position.

The above embodiments can be suitably combined. In the above drawings, the same or corresponding portions are designated with the same reference numerals. Note that the above embodiments are examples, and do not limit the invention. Further, the embodiments include modifications of aspects described in the claims.

The invention claimed is:

1. A teaching apparatus for robot, which determines a position and a posture of an end effector attached to a robot with respect to a predetermined object and which stores a position and a posture of the robot as a teaching position corresponding to the position and the posture of the end effector, comprising:
   a robot control device for controlling the robot;
   a force sensor which is disposed between an arm of the robot and the end effector and which detects a force applied to the end effector and a direction of the force; and
   a guide part attached to one member among the end effector and the object; wherein
   the other member among the end effector and the object comprises a recessed part having a sectional shape which corresponds to a shape of an end part of the guide part and which is larger than a sectional shape of the end part of the guide part,
   the guide part has a target surface formed in the end part,
   the recessed part has a reference surface with which the target surface of the guide part is brought into surface-contact so as to determine the position and the posture of the robot,
   the force sensor detects the direction of a force applied to the end effector when the target surface of the guide part is brought into surface-contact with the reference surface of the recessed part, and
   the robot control device performs a control for bringing the target surface of the guide part into surface-contact with the reference surface of the recessed part based on the direction of the force applied to the end effector, to adjust the position and the posture of the robot and to determine the teaching position of the robot with respect to the object,
   the teaching apparatus further comprising a teaching operation panel which is connected to the robot control device and via which the robot is manually operated, wherein
   the robot control device performs a control for stopping the robot, when a force applied to the end effector exceeds a predetermined judgement value, while an operator performs a manual operation for inserting the end part of the guide member into the recessed part.

2. The teaching apparatus for robot according to claim 1, wherein the guide part is formed so as to be detachable from the one member.

\* \* \* \* \*